Aug. 7, 1973   C. N. DRUMMOND ET AL   3,751,333
NUCLEAR REACTOR CORE MONITORING SYSTEM
Filed June 11, 1970                              3 Sheets-Sheet 1

INVENTORS
Carl N. Drummond
Richard T. Bybee
Fred L. Mason
Herbert J. Worsham, Jr.
BY  *J Maguire*
    ATTORNEY

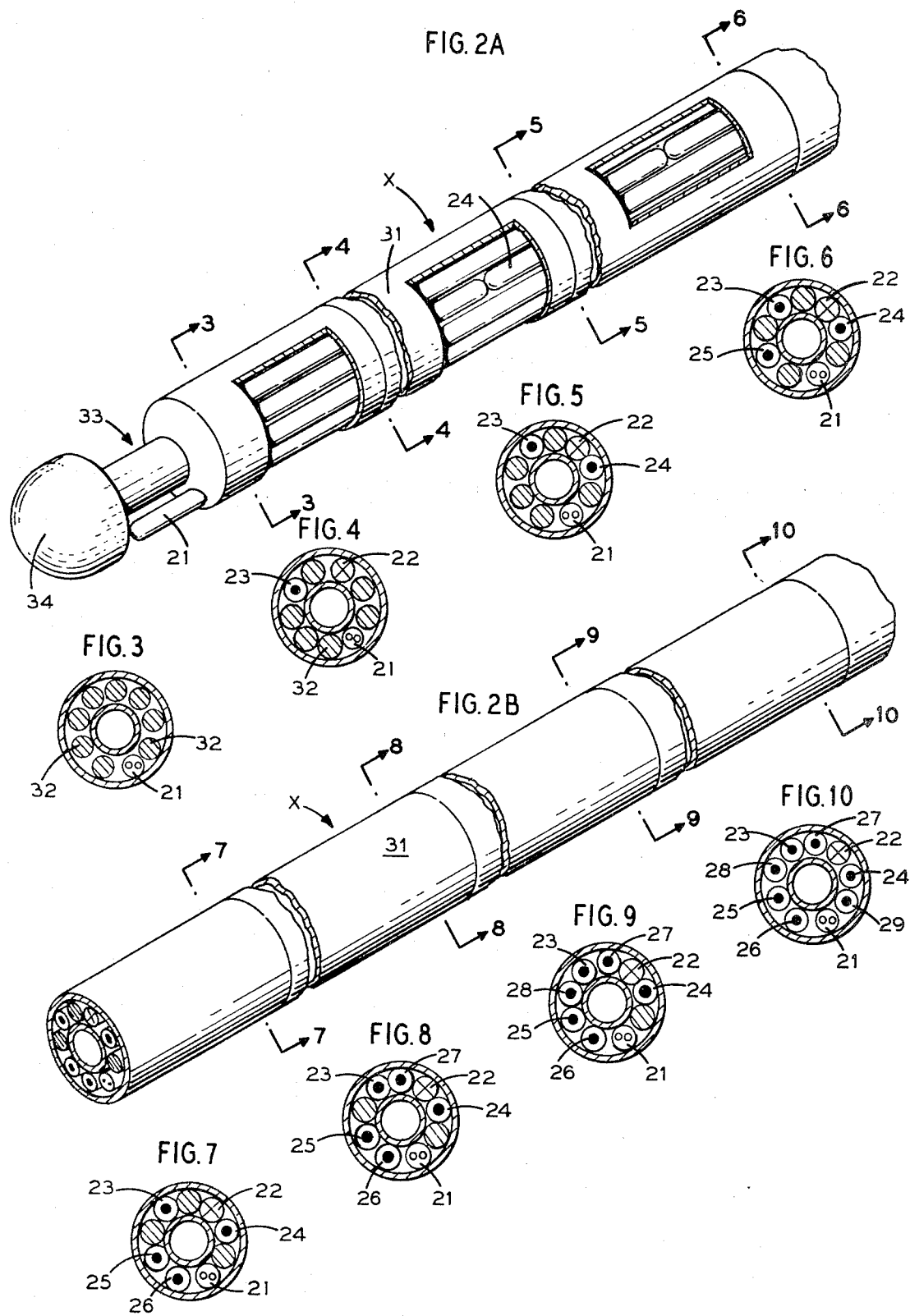

United States Patent Office 3,751,333
Patented Aug. 7, 1973

3,751,333
NUCLEAR REACTOR CORE MONITORING
SYSTEM
Carl N. Drummond, 731 Custer Drive 24502; Richard
T. Bybee, 1212 Cedar Hills Drive 24502; Fred L.
Mason, 524 Oakridge Blvd. 24502; and Herbert J.
Worsham, Jr., 1909 McGuffey Lane 24503, all of
Lynchburg, Va.
Filed June 11, 1970, Ser. No. 45,468
Int. Cl. G21c 17/10
U.S. Cl. 176—19 R                                    8 Claims

ABSTRACT OF THE DISCLOSURE

A nuclear reactor core monitoring system in which the neutron flux and/or temperature at locations along a passage extending through the core are sensed by detectors in an elongated instrumentation assembly inserted into the passage from a handling station outside the core region. The instrumentation assembly is laterally flexible so that it can negotiate bends in the passage. A hollow tube is included in the assembly for insertion therein of a standard neutron detector for periodically calibrating the other detectors.

---

This invention relates in general to the instrumentation of nuclear reactors and more particularly to a nuclear reactor core monitoring system in which the neutron flux and/or temperature at locations along a passage extending through the core are sensed by detectors in an elongated instrumentation assembly that is inserted into the passage from a handling station remote from the core.

With certain prior art techniques used to monitor reactor core conditions there were encountered problems in removing and replacing in-core instrumentation whenever it became necessary to replace or service the fuel units. Furthermore, there existed no convenient means for periodically calibrating detectors that had become depleted and changed in sensitivity due to radiation exposure.

The invention overcomes these prior art difficulties and disadvantages by providing a core monitoring system in which a plurality of solid-state electrical signal output type detectors are incorporated into an elongated instrumentation assembly that can be moved longitudinally through a passage extending from the handling station into the core. This instrumentation assembly is laterally flexible so that it can negotiate bends in the passage when advanced therein or withdrawn therefrom. Under normal monitoring conditions the instrumentation assembly is advanced within the passage to a terminal position within the core. Should it be desired to service the core, the instrumentation assembly can be retracted by manipulation at the handling station until the leading end of the assembly is withdrawn in the passage to a point outside the core. Complete removal of the instrumentation assembly from the passage is therefore not required for core servicing although this can be easily done for repair or replacement of individual detectors.

The detectors of the instrumentation assembly can include at least one thermocouple and a plurality of radiation detectors such as neutron flux detectors and a background radiation detector.

To facilitate monitoring of neutron flux profile the neutron flux detectors are positioned to sense the neutron flux at respectively corresponding spaced zones of the core when the assembly is at its terminal position therein.

An in-service detector calibration feature is provided in the system of the invention by the inclusion within the instrumentation assembly of a hollow tube extending for substantially the full length thereof. This tube accommodates the insertion at the handling station of a calibration standard neutron flux detector used for periodically calibrating the other neutron flux detectors to check their sensitivity characteristics at various stages of depletion from neutron bombardment.

To achieve a compact flexible instrumentation assembly the neutron flux detectors are located in angularly spaced-apart relation to one another in a pattern surrounding the calibration detector insertion tube with an outer sheath surrounding the tube and all detectors.

Movement of the calibration detector in the tube is effected by a mechanical drive means connected to the detector and operable at the handling station to selectively shift the calibration detector along the length of the tube.

For a better understanding of the invention reference should be had to the accompanying drawings.

In the drawings:
FIG. 1 is a schematic elevation view, partly in section of a nuclear reactor arrangement provided with a core monitoring system according to a preferred embodiment of the invention.

FIG. 2A is a perspective view of the leading end portion of the instrumentation assembly shown in FIG. 1 with portions of the outer covering thereof removed to show internal construction details.

FIG. 2B is a perspective view of a lengthwise portion of the instrumentation assembly adjoining that shown in FIG. 2A.

FIG. 3 is a transverse cross-sectional view of the instrumentation assembly as taken along line 3—3 of FIG. 2A.

FIG. 4 is a transverse cross-sectional view of the instrumentation assembly as taken along line 4—4 of FIG. 2A.

FIG. 5 is a transverse cross-sectional view of the instrumentation assembly as taken along line 5—5 of FIG. 2A.

FIG. 6 is a transverse cross-sectional view of the instrumentation assembly as taken along line 6—6 of FIG. 2A.

FIG. 7 is a transverse cross-sectional view of the instrumentation assembly as taken along line 7—7 of FIG. 2B.

FIG. 8 is a transverse cross-sectional view of the instrumentation assembly as taken along line 8—8 of FIG. 2B.

FIG. 9 is a transverse cross-sectional view of the instrumentation assembly as taken along line 9—9 of FIG. 2B.

FIG. 10 is a transverse cross-sectional view of the instrumentation assembly as taken along line 10—10 of FIG. 2B.

Figure 1:
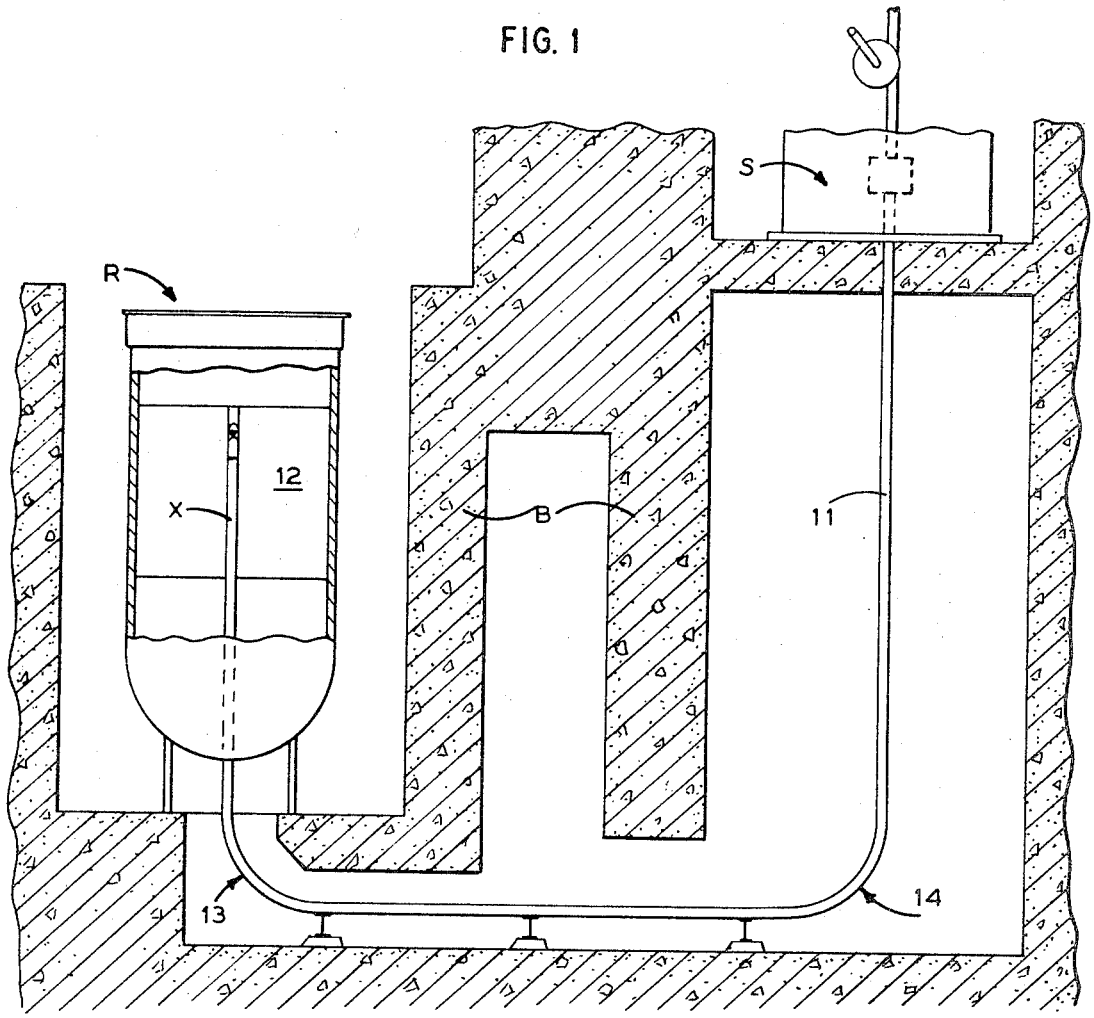

In the nuclear reactor arrangement presented in FIG. 1, there is provided a passage 11 that extends from a handling station S outside the reactor R into the core 12 thereof. Passage 11 is expediently defined by sections of pipe connected together in a continuous, pressure-tight fashion, and can have one or more bends as at 13, 14, to go around such biological shielding B as is interposed between reactor R and station S.

To sense physical conditions, such as neutron flux and/or temperature at locations within core 12, an elongated instrumentation assembly X is inserted into passage 11 at the handling station S and is advanced lengthwise therethrough until the leading end of assembly X arrives at a predetermined terminal position within core 12. Assembly X has sufficient lateral flexibility to negotiate the bends 13, 14, in passage 11 without excessive strain. The monitoring functions of assembly X are performed by a plurality of solid state type detectors that are operable to sense corresponding flux/temperature conditions existing in core 12 and establish respective electrical output signals representing such sensed conditions.

As better seen from FIGS. 2A, 2B, and 3–10, the detectors of assembly X include a thermocouple 21, a background radiation detector 22, and a group of seven radiation detectors 23, 24, 25, 26, 27, 28, 29 which sense neutron flux. All of these detectors 21–29 are disposed in an angularly spaced-apart relation to one another and in a pattern surrounding hollow tube 30 that extends for substantially the entire length of assembly X. For any given application of the invention, the number and combination of detector types i.e. thermocouple, background radiation, neutron flux radiation, etc., can be varied according to particular requirements. An outer sheath 31 surrounds tube 30, the detectors 21–29 and spacers 32 employed to prevent shifting of detectors 21–29 in the annular space between tube 30 and sheath 31.

For purposes of simplification, the core monitoring system of the invention is shown in the drawing as one having provisions to accommodate only one instrumentation assembly X having detectors 21–29 which sense core 12 conditions existing along the lengthwise portion of passage between the top and bottom of the active core 12, i.e. along a single axially directed path. It is to be understood that such basic core monitoring system can be expanded as desired by repeated duplication of the elementary passage 11 and assembly X combination, in order to provide axial flux or temperature profile monitoring at more than one radial location in core 12.

To obtain data sufficient to establish a core flux profile along the axis of passage 11, the neutron flux detectors 23–29 are constructed so as to sense neutron flux over a limited axial length range, in the order of a few inches as established by the lengths and axial spacing of their individual emitters. Solid state neutron flux detectors which are capable of performing such functions are generally known in the prior art, and details of their construction can be found in U.S. Pat. No. 3,375,370 to Hilborn, and in U.S. Pat. No. 3,400,289 to Anderson.

A typical detector 23–29 has an emitter which emits electrons when bombarded by neutrons, a collector, and an insulator interposed between emitter and collector. As is expedient in the case of the instant invention, the emitter and its lead wire are coaxially disposed within a tubular collector that is closed at its in-core end and extends with the emitter lead wire somewhat beyond the out-core end of asssembly X to accommodate connection to monitoring and/or metering equipment (not shown) at station S. The length of an emitter corresponds to the axial length of the sensing range of the corresponding detector 23–29, and begins slightly behind the closed end of the collector thereof.

The background radiation detector 22 is similar in construction to the neutron flux detectors 23–29, except that the background detector 22 has for an emitter, a continuous length of lead wire whereas detectors 23–29 have a short piece (about 4 inches long) of highly sensitive rod or wire such as rhodium, for an emitter which is endwise connected to a lead wire having a much lower sensitivity (in terms of electron emission) to neutron bombardments.

Thermocouple 21 has a protective sheath, as for example, one made of stainless steel or Inconel, similar to that used as collector tubing in detectors 23–29. To sense temperature at the top of the active core, the junction end of thermocouple 21 is extended into a clearance space provided by a nose plug 33 and is protected from abrasion by the tip 34 of plug 33. Tube 30 and sheath 31 are joined to plug 33 by welding.

Because the detectors 22–29, or more precisely their respective in core ends, are disposed in longitudinally spaced-apart relation to one another within assembly X, so as to sense neutron flux at correspondingly spaced zones of core 12 when assembly X is inserted to its terminal position therein, the spacers 32 are inserted between the in-core ends of detectors 22–29 and plug 33. Spacers 32 are made of the same type of tubing as is used for the collectors of detectors 22–29, the length of each spacer 32 being that needed to fit between plug 33 and the end of the corresponding aligned detector 22–29.

For example, at the assembly X section shown by FIG. 3 there are no detectors 22–29 this far forward, and consequently the cross-sectional detector contents of assembly X includes only thermocouple 21. At the section shown by FIG. 4, the cross-sectional detector contents further includes background detector 22 and neutron detector 23, and the spacers 32 ahead of such detectors 22 and 23 are terminated ahead of line 4—4 and therefore do not appear in FIG. 4. In a similar fashion, detector 24 is added to the combination between lines 4—4 and 5—5, as is detector 25 between lines 5—5 and 6—6, detector 26 between lines 6—6 and 7—7, detector 27 between lines 7—7 and 8—8, detector 28 between lines 8—8 and 9—9, and detector 29 between lines 9—9 and 10—10.

Because the reactor core 12 will ordinarily contain pressurized fluid for cooling, the pipe 35 defining passage 11 and the instrumentation assembly X are sealed at handling station S to prevent leakage of such fluid.

Figure 11:
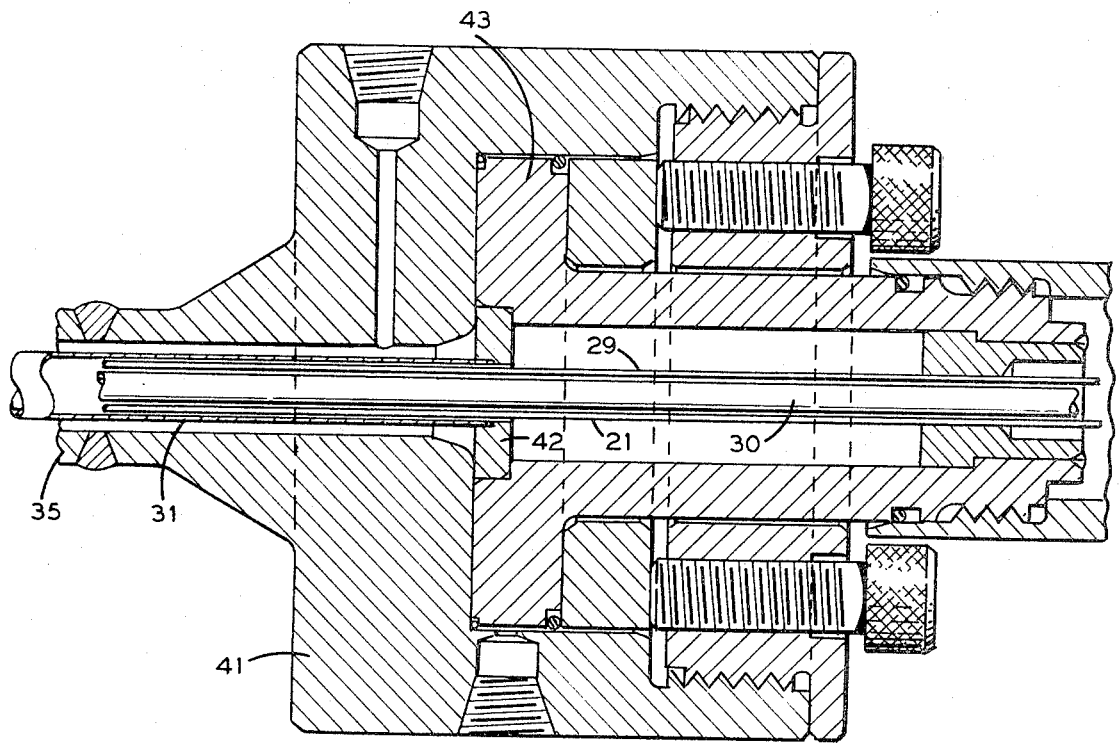
FIG. 11 is a longitudinal sectional view of the instrumentation assembly of FIGS. 1, 2A, 2B, showing details of a typical arrangement for sealing the assembly and its insertion passage at the handling station.

The typical sealing arrangement shown in FIG. 11 provides a housing 41 welded to pipe 35 at station S. Within housing 41 a flange 42 is sealed welded to the end of sheath 31. A compression flange 43 presses flange 42 into sealing engagement with housing 41 thereby preventing any leakage of fluid from the space between sheath 31 and pipe 35.

Figure 12:
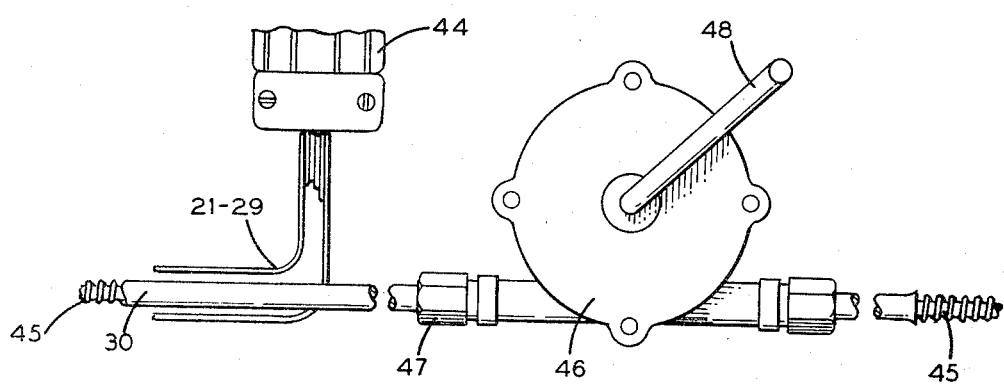
FIG. 12 is a schematic longitudinal view showing details of a typical drive means for positioning a calibration detector within the instrumentation assembly.

The tube 30, provided to accommodate insertion of a calibration detector (not shown) into assembly X, extends beyond housing 41, as do the collector sheaths and lead wires of detectors 22–29 and thermocouple 21, as seen in FIG. 12.

To provide convenient transfer of the electrical output signals of detectors 22–29 and thermocouple 21, the lead wires and collector sheaths thereof are connected to terminals of a conventional multi-conductor plug 44.

The invention contemplates the use of a calibration detector that is generally similar in construction to the neutron detectors 23–29, functions similarly except for being moveable lengthwise inside tube 30, and is enclosed by a collector sheath 45.

In view of the moveability requirement upon the calibration detector, the collector sheath 45 thereof, or at least the out-core portion of the sheath, is made of tubing formed on its outside so as to present a threaded or worm configuration, as shown in FIG. 12. The threads on the collector sheath 45 are engaged by a worm wheel 46 which drives the collector through the center of a nut 47 that terminates the calibration detector tube 30. As shown in FIG. 12, the worm wheel 46 is driven by means of a hand crank 48.

The lateral flexibility of the assembly X will depend upon the stiffness values of the detectors 21–29, calibration detector guide tube 30, spacers 32 and sheath 31 and the resultant flexibility of assembly X can be made sufficient to enable negotiation of bends in passage 11 by appropriate selection of the cross-sectional sizes and materials for the elements 21–32, by the application of well known engineering design techniques. It will thus become apaprent to the artisan that the flexibility controlling parameters of elements 21–32 making up assembly X can be chosen for a given minimum bend radius of passage 11, or conversely, the minimum bend radius in passage 11 can be chosen for suitability with the lateral flexibility of assembly X constructed according to a given design.

What is claimed is:

1. In a neuclear reactor arrangement having a passage with a plurality of bends therein, the passage extending from a handling station outside the reactor and into the core thereof, a core monitoring system which comprises a laterally flexible and elongated continuous sheath having a length generally equal to the length of the passage and disposed at the handling station for insertion into the passage and longitudinally moveable therethrough said lateral flexibility enabling said continuous sheath to negotiate the passage bends in order to be moved to a predetermined position within the reactor core, and a plurality of detectors arranged within said sheath and operable to sense physical conditions in the reactor core and establish respective output signals representing such sensed conditions, wherein said sheath includes a hollow tube and a radiation detector moveable longitudinally within said tube to sense the radiation intensity at selected locations within the core when the sheath is inserted to said predetermined position.

2. A core monitoring system according to claim 1 wherein said detectors include at least one neutron flux detector.

3. A core monitoring system according to claim 1 wherein said detectors include at least one thermocouple protruding in a longitudinal direction from said sheath.

4. A core monitoring system according to claim 1 wherein said detectors include a background radiation detector and a plurality of neutron flux detectors.

5. A core monitoring system according to claim 1 wherein said detectors include neutron flux detectors positioned to sense the neutron flux at corresponding spaced zones of the core when the sheath is at said predetermined position therein.

6. A core monitoring system according to claim 1 wherein said detectors include radiation detectors and at least one thermocouple, said radiation detectors having respective electrical output signals.

7. A core monitoring system according to claim 1 wherein said detectors include radiation detectors disposed in angularly spaced-apart relation to one another and in a pattern surrounding said tube.

8. A core monitoring system according to claim 1 including drive means connected to said moveable radiation detector and operable at said handling station to selectively shift said detector along the length of said tube.

References Cited

UNITED STATES PATENTS

| | | | |
|---|---|---|---|
| 3,025,226 | 3/1962 | Martin et al. | 176—19 R |
| 3,597,613 | 8/1971 | Ratagopal | 250—83.1 |
| 3,043,954 | 7/1962 | Boyd et al. | 250—83.1 |
| 3,073,959 | 1/1963 | Jervis | 250—83.1 |
| 3,160,567 | 12/1964 | Steinberg et al. | 176—19 R |
| 3,237,009 | 2/1966 | Warman et al. | 250—83.1 |
| 3,566,117 | 2/1971 | Tixler et al. | 250—83.1 |
| 3,565,760 | 2/1971 | Parkos et al. | 250—83.1 |

FOREIGN PATENTS

| | | | |
|---|---|---|---|
| 1,303,291 | 7/1962 | France | 176—19 R |

REUBEN EPSTEIN, Primary Examiner